United States Patent
Cho et al.

(10) Patent No.: US 12,064,811 B2
(45) Date of Patent: Aug. 20, 2024

(54) POWDERY FILAMENT COMPOSITION FOR 3D PRINTING, 3D PRINTER AND METHOD FOR MANUFACTURING OBJECTS ADDITIVELY BY USING THE SAME 3D PRINTER

(71) Applicant: UIF (University Industry Foundation), Yonsei University, Seoul (KR)

(72) Inventors: Jeong Ho Cho, Seoul (KR); Soo Young Cho, Gyeonggi-do (KR); Dong Hae Ho, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 17/847,022

(22) Filed: Jun. 22, 2022

(65) Prior Publication Data

US 2023/0022092 A1   Jan. 26, 2023

(30) Foreign Application Priority Data

Jun. 22, 2021 (KR) .................. 10-2021-0080687
Apr. 4, 2022 (KR) .................. 10-2022-0041563

(51) Int. Cl.
*B33Y 70/00* (2020.01)
*B22F 1/05* (2022.01)
(Continued)

(52) U.S. Cl.
CPC ............ *B22F 10/18* (2021.01); *B22F 1/05* (2022.01); *B22F 1/105* (2022.01); *B33Y 10/00* (2014.12);
(Continued)

(58) Field of Classification Search
CPC .. B22F 10/18; B22F 1/05; B22F 1/105; B22F 2304/10; B22F 5/10; B22F 12/13;
(Continued)

(56) References Cited

U.S. PATENT DOCUMENTS

2015/0291921 A1*  10/2015  Rives .................... B22F 1/105
425/130

FOREIGN PATENT DOCUMENTS

| EP | 3878578 A1 * | 9/2021 |
| KR | 10-1689304 | 12/2016 |
| WO | WO 2016/080573 | 5/2016 |

OTHER PUBLICATIONS

Cho et al., "A general fruit acid chelation route for eco-friendly and ambient 3D printing of metals," Nature Communications (2022) 13:104.

(Continued)

*Primary Examiner* — Rebecca Janssen
(74) *Attorney, Agent, or Firm* — Morrison & Foerster LLP (57) ABSTRACT

The disclosure relates to a powdery filament composition for 3D printing, a 3D printer, and a method of additively manufacturing an object by the 3D printer, and more particularly to a powdery filament composition for 3D printing, which is suitable for home use because it does not produce toxic substances, a 3D printer, the size of which is suitable for home use because it does not require high power energy, high-temperature processing and the like conditions for additive manufacturing, and a method of additively manufacturing an object by the 3D printer.

5 Claims, 10 Drawing Sheets

(51) Int. Cl.
  *B22F 1/105* (2022.01)
  *B22F 10/18* (2021.01)
  *B33Y 10/00* (2015.01)
  *B33Y 30/00* (2015.01)
  *B33Y 40/20* (2020.01)
  *C09D 11/38* (2014.01)

(52) U.S. Cl.
  CPC ............... *B33Y 30/00* (2014.12); *B33Y 40/20* (2020.01); *B33Y 70/00* (2014.12); *C09D 11/38* (2013.01); *B22F 2304/10* (2013.01)

(58) Field of Classification Search
  CPC ...... B22F 2998/10; B22F 12/50; B22F 12/63; B22F 1/10; B22F 12/55; B22F 10/28; B33Y 10/00; B33Y 30/00; B33Y 40/20; B33Y 70/00; C09D 11/38; C09D 11/322; Y02P 10/25; C07C 63/38
  See application file for complete search history.

(56) References Cited

OTHER PUBLICATIONS

Cho et al., "A general fruit acid chelation route for eco-friendly and ambient 3D printing of metals," Research Square. Retrieved from DOI: https://doi.org/10.21203/rs.3.rs-310961/v1.

\* cited by examiner

POWDERY FILAMENT COMPOSITION FOR 3D PRINTING, 3D PRINTER AND METHOD FOR MANUFACTURING OBJECTS ADDITIVELY BY USING THE SAME 3D PRINTER

CROSS REFERENCE TO RELATED APPLICATION

The present application claims priority to Korean Patent Application No. 10-2021-0080687, filed Jun. 22, 2021, and to Korean Patent Application No. 10-2022-0041563, filed Apr. 4, 2022, the entire contents of which are incorporated herein for all purposes by this reference.

FIELD OF THE INVENTION

The disclosure relates to a powdery filament composition for 3D printing, a 3D printer, and a method of additively manufacturing an object by using the 3D printer, and more particularly to a powdery filament composition for 3D printing suitable for household as no toxic substances are generated, and a 3D printer and a method of additively manufacturing an object by the same, in which high output energy sources and high temperature treatment, and the like conditions are not required, thereby providing in a size suitable for the household.

DESCRIPTION OF THE RELATED ART

Additive manufacturing (AM) or 3D printing is one of the most important technologies in the Fourth Industrial Revolution in that it enables personal design and rapid prototype creation of a product. Many researchers have focused on developing printing materials and 3D printing technologies to expand the fields of additive manufacturing technology.

As a result, new printing materials and 3D printing technologies have been developed for exquisite printing, thereby accelerating the application of the additive manufacturing technology to various industrial fields, such as aerospace, biopharmaceutical, and food industries. Further, metal additive manufacturing technology research has also been actively conducted and applied to various industrial areas.

However, unlike polymer additive manufacturing, metal additive manufacturing is applicable only on an industrial or academic scale because it is difficult to be applied on a home scale due to demanding printing conditions. To break through such difficulties, selective laser melting and electron-beam melting technologies have been proposed, but they have also been limitedly applicable due to their printing processes that require a powerful energy source, an inert gas atmosphere, and high-temperature preheating.

Binder jetting metal 3D printing (BJM3DP) refers to a technology that bonds metal particles by jetting a liquid binder to metal power, and is a promising additive manufacturing technology. The 3D printing based on this technology does not need a heat-calcinating process that requires particular conditions and equipment. In addition, the BJM3DP is very suitable for personalization because its size is reduceable with customized kits and commercially available ink cartridges.

Despite these advantages, the BJM3DP has not been commercialized yet because the use of the binder causes environmental and safety issues. Such environmental and safety issues mainly arise due to two substances in the binder. The two substances are a 2-butoxyethanol-based solution and a 2-pyrrolidone-based solution which are toxic but the most widely used.

Further, a recently developed metal-organic diffusion ink contains cupric formate and octylamine, which have also been found to affect environments negatively.

Accordingly, the development of an ecofriendly and harmless binder is necessary for the application of the BJM3DP on the scale of a desk for home use.

DOCUMENTS OF RELATED ART

Patent Documents (Patent Document 0001) Korean Patent No. 10-1689304 (registered on Dec. 19, 2016)

SUMMARY OF THE INVENTION

Technical Problem

An aspect of the disclosure is to provide an ecofriendly and harmless printing material for a 3D printer.

Another aspect of the disclosure is to provide a 3D printer, which can be manufactured small because a printing material used therefor does not require high temperature and high energy, and sized for home use because the material is not harmful, and a method of additively manufacturing an object by the 3D printer.

Technical Solution

According to the aspect of the disclosure, there is provided a powdery filament composition for 3D printing, including: metal powder; and multifunctional carboxylic acid salt powder as a chelator to react with water and form a bridge for strengthening a bond between the metal powders According to an embodiment of the disclosure, the multifunctional carboxylic acid salt may include a multifunctional α-hydroxy acid salt.

According to an embodiment of the disclosure, the multifunctional carboxylic acid salt may include a metal salt compound of a fruit acid derived from fruits.

According to an embodiment of the disclosure, the metal powder may include power of copper (Cu), iron (Fe), aluminum (Al), titanium (Ti) or an alloy including one or more selected among them.

According to an embodiment of the disclosure, the metal powder and the chelator may be mixed in a weight ratio of 90:10 to 75:25.

According to an embodiment of the disclosure, the metal powder may have an average particle size of 5 μm to 400 μM.

According to an embodiment of the disclosure, the powdery filament may further include an alkali metal salt additive.

According to the aspect of the disclosure, there is provided a 3D printer including:
a feeder box filled with the foregoing a powdery filament composition for 3D printing, and configured to provide a predetermined amount of a powdery filament composition whenever additive manufacturing is performed once;
a builder box horizontally disposed alongside the feeder box, and configured to perform 3D printing with the powdery filament composition received from the feeder box whenever additive manufacturing is performed once; and a working unit disposed above the feeder box and the builder box, and configured to reciprocate between an upper side of the feeder box and an upper side of the builder box, transfer a predetermined amount of a powdery filament composition from the feeder box to the builder box while moving from the upper side of the feeder box to the upper side of the builder box when the reciprocation is performed once, spray water onto the powdery filament composition in a pattern corresponding to a desired shape of an object while horizontally moving above the builder box so that a bridge can be formed in the powdery filament composition corresponding to a spraying area to perform printing, and horizontally move to return to the upper side of the feeder box.

According to an embodiment of the disclosure, the 3D printer may further include a heat bed that is provided in the floor of the builder box, and includes a heat source to adjust an additively manufacturing temperature for the powdery filament composition being printed.

According to an embodiment of the disclosure, the feeder box may include a floor that moves up to a predetermined height when the working unit reciprocates once between the upper side of the feeder box and the upper side of the builder box while feeding the powdery filament composition, and the builder box may include a floor that moves down to a predetermined height when the working unit reciprocates once between the upper side of the feeder box and the upper side of the builder box.

According to an embodiment of the disclosure, the working unit may include an inkjet cartridge configured to spray water, and a roller configured to level the surface of the powdery filament composition at the upper side of the builder box.

According to the aspect of the disclosure, there is provided a method of additively manufacturing an object by the 3D printer, the method including the steps of:

1) filling the feeder box with the powdery filament composition for 3D printing;
2) transferring a predetermined amount of a powdery filament composition at the top of the feeder box to the builder box while the working unit above the feeder box horizontally moves toward the builder box, and leveling the surface of the transferred a powdery filament composition;
3) spraying water in a predetermined pattern to form a bridge in the composition corresponding to an area to which water is sprayed, while the working unit horizontally moves above the powdery filament composition transferred to the upper side of the builder box; and
4) preparing the next additive manufacturing by moving the working unit to the upper side of the feeder box and raising the floor, of the feeder box to a predetermined height, wherein the steps of 1) to 4) are repeated to complete a certain shape.

According to an embodiment of the disclosure, in the step 3), the bridge is formed under a condition that the floor of the builder box has a temperature of 50° C. to 85° C. The temperature of the floor of the builder box may preferably range from 60° C. to 80° C., and more preferably range from 65° C. to 75° C.

According to an embodiment of the disclosure, the method may further include the step of sintering the additively manufactured object.

Advantageous Effects

According to the disclosure, there is no need to worry about scattering of harmful substance because the powdery filament composition for 3D printing employs a binder compound that is ecofriendly and harmless to a human body, and the inkjet cartridge sprays only water.

Further, according to the disclosure, the powdery filament composition for 3D printing does not require high energy for additive manufacturing, and therefore the 3D printer for the additive manufacturing can be miniaturized, thereby being advantageously supplied for home use as well as 3D printers for industrial or academic purposes.

DETAILED DESCRIPTION OF THE INVENTION

Below, aspects, configurations, and effects according to embodiments of the disclosure will be described in detail with reference to the accompanying drawings.

Prior to description, the meanings of terms used in this specification will be defined clearly.

In this specification, the term "powdery composition" refers to composition given in the form of the mixture of powders, and each composition may be mixed in each powder particle or mixed as divided into separate particles.

In this specification, the term "filament" refers to a raw material to be additively constructed forming an object in 3D printing or additive manufacturing.

As described above, in the case of conventional additive manufacturing or 3D printing, polymer additive manufacturing has problems such as destruction of the environment and harmfulness to a human body, and metal additive manufacturing proposed to solve such problems also has a problem in that it is difficult to be implemented as small equipment for home use because conditions of additively constructing a filament material are severely required. For example, conditions that are difficult to meet in the household, such as a powerful energy source, an inert gas atmosphere, and the like were required.

Thus, the present inventors have been immersed in research on improvement in an additive manufacturing method using metal powder, and developed a powdery filament composition for 3D printing, which includes metal powders; and multifunctional carboxylic acid salt powder used as a chelator to form a bridge to strengthen a bond between the metal powders by reacting with water, thereby reducing the problems of the polymer additive manufacturing, such as the destruction of the environment or the harmfulness to a human body. In particular, the multifunctional carboxylic acid salt used as the chelator to serve as a binder for forming the bridge has the advantage of being eco-friendly because it is obtained from living things (animal and vegetable sources).

1) Metal Powder

The metal powder forms a framework of an additively manufactured object, and has an advantage of being less harmful to a human body and having higher strength than polymer filament materials.

The metal powder may include powder of copper (Cu), iron (Fe), aluminum (Al), titanium (Ti), or an alloy containing one or more selected among them, but is not limited thereto. For example, there is a Ti-6Al-4V alloy (also called Grade 5).

The metal powder may have an average particle size of 5 μm to 400 μm. When the size of the metal powder is less than 5 μM, manufacturing costs may increase. When the average particle size of the metal powder is greater than 400 μm, the porosity in the object excessively increase, thereby leading to decrease in the effectiveness of the chelation and thus causing decrease in strength. When two or more kinds of particles different in size from each other are mixed, it is possible to further decrease the porosity between the particles, thereby having an effect on increasing the strength of an additively manufactured object.

In general, the metal powder may include aluminum powder.

2) Chelator

The chelator refers to a molecule that can form two or more coordinate bonds with a metal atom on the surface of the metal powder.

According to the disclosure, the chelator uses the multifunctional carboxylic acid salt.

The multifunctional carboxylic acid salt refers to a compound having a structure of —COO-M$^+$, where a multifunctional carboxylic acid, which is a compound containing two or more —COOH of carboxylic acid in one molecule, is ionically bonded to a metal cation.

According to the disclosure, the multifunctional carboxylic acid salt is employed as the chelator, so that an anion of the chelator, i.e., a carboxylic acid anion can be coordinate-bonded to metal atoms of the metal powder at two or more positions when water is sprayed to the multifunctional carboxylic acid salt, thereby forming a crosslink between the metal powders. Such a crosslink will be called a bridge.

The metal powder reacts with oxygen in air and is formed with an oxide film oxidized on the surface thereof. However, the oxide film has defects, so that the chelator can penetrate the metal powder through the defects of the oxide film, thereby forming bonds with exposed metal atoms of the metal powder.

Figure 3:
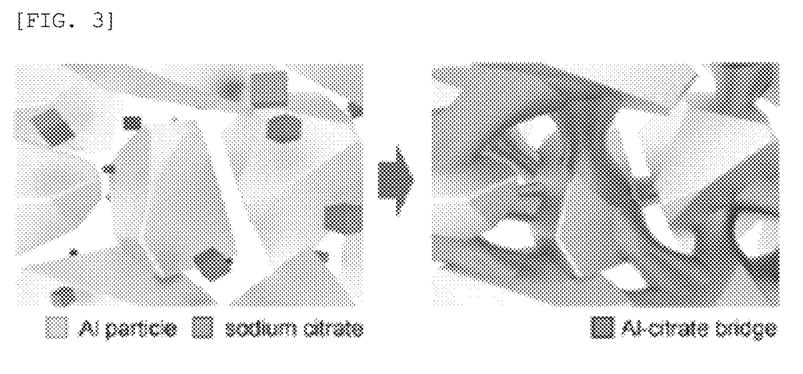
FIG. 3 is a view showing that a binder forms a bridge between metal powders before and after jetting water to a powdery filament composition for 3D printing according to an embodiment of the disclosure.
Figure 4:
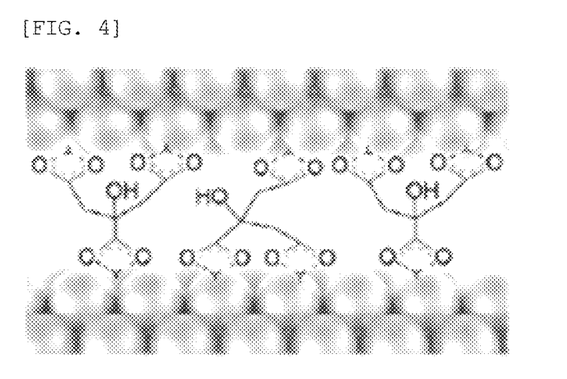
FIG. 4 is a view showing chemical structural formulae based on a chemical principle that a binder forms a bridge between metal powers in a powdery filament composition for 3D printing according to an embodiment of the disclosure.
Figure 5:
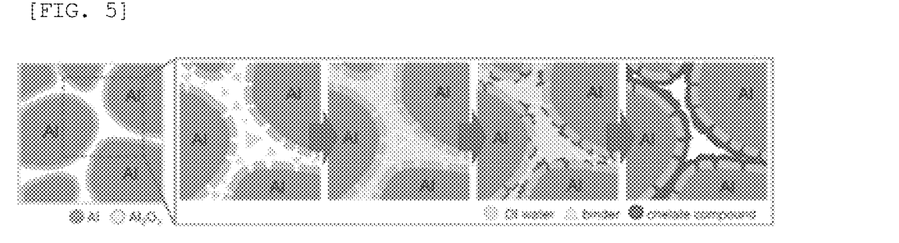
FIG. 5 is a view schematically showing a principle that a binder forms a bridge between surfaces of metal powder when water (deionized (DI) water) to a powdery filament composition for 3D printing according to an embodiment of the disclosure.

FIGS. 3 to 5 are schematic views of such mechanism. In FIG. 3, 'Al particle' indicates powder of aluminum, i.e., metal, and 'sodium citrate' indicates sodium salt of citric acid, i.e., the multifunctional carboxylic acid salt as the chelator. The right side in FIG. 3 schematically shows a result of spraying water to Al particles and sodium citrate, and it will be understood that the bond and the strength are enhanced as an Al-citrate bridge (grey) is formed to make a crosslink between the particles of the aluminum powder.

In this case, the bonding form and the chemical structure between the metal (aluminum) and the citric acid anion in the bridge are schematically shown in FIG. 4, and it will be understood that the chelation is done as a functional group of citric acid, i.e., a —COOH group is coordinate-bonded to an aluminum atom at two positions in the form of —COO that has lost a hydrogen ion. The citric acid is a trifunctional carboxylic acid, and therefore such a bond is formed with respect to a plurality of aluminum atoms, thereby forming the bridge.

According to an embodiment of the disclosure, the multifunctional carboxylic acid salt may be a multifunctional α-hydroxy acid salt. When a hydroxyl group is attached to α-carbon, a bridge may be more strongly formed because the hydroxyl group is a functional group having a dipole moment large enough to enable a hydrogen bond.

Further, the multifunctional carboxylic acid salt may be a salt of a carboxylic acid having three or more carboxyl groups. When there are more carboxyl groups, the chelation increases and the bridge between the metal powders becomes stronger, thereby enhancing the strength of the finally manufactured object.

According to an embodiment of the disclosure, the multifunctional carboxylic acid salt may be a metal salt compound of a fruit acid derived from fruits. As a natural substance, the fruit acid is harmless to a human body and does not cause a problem of respiratory disease or accumulation in a body even though it scatters. Also, there is little burden on the environment even when disposing of the fruit acid.

For example, a metal salt of a succinic acid, a tartaric acid, and a citric acid may be used as the fruit acid. However, the citric acid or tartaric acid having the hydroxyl group at the alpha position is preferable, and the metal salt of the citric acid, i.e., the trifunctional carboxylic acid is more preferable.

Further, the chelator may include a sodium salt of the multifunctional carboxylic acid. The sodium salt has advantages in that a reaction is faster than those of other metal salts because the sodium salt is easily dissociated in water, and the minimum burden falls on environmental pollution because the sodium salt is not a heavy metal. However, the chelator is not limited to the sodium salt.

The chelator may be provided in the form of powder, and may be mixed with the metal powder in the powdery filament composition for the 3D printing so that a weight ratio of (metal powder):(chelator powder) can range from 90:10 to 75:25.

When the content of the chelator powder is less than 10 wt %, the bridge is not sufficiently formed between the metal powders and therefore the object is likely to crumble with weakened strength. When the content of the chelator powder is more than 25 wt %, the amount of metal to be used as a framework is insufficient and therefore the strength is also weakened.

3) Additives

According to an embodiment of the disclosure, the powdery filament composition for the 3D printing may further include alkali metal salt additives.

The alkali metal salt additive serves to make metal ions from defects internally present in the metal powder be easily bonded to the chelator. The alkali metal salt additive may make the bond stronger, and therefore the manufactured object may also be increased in strength.

The alkali metal salt may include the sodium salt, and may be sodium chloride (NaCl), which can be used for food, to avoid environmental pollution and harmfulness to a human body. The alkali metal salt may be provided in the form of powder, and may have a solubility of 3 g or more per 100 g in water so as to smoothly promote the boding.

The alkali metal salt additive may be included at a weight ratio of 2 wt % to 7 wt % with respect to the total a powdery filament composition for the 3D printing. The alkali metal salt additive should not be included too much because it is not directly involved in forming the bridge. On the other hand, too less alkali metal salt additive may not have an effect.

4) 3D Printer

The foregoing a powdery filament composition for the 3D printing may be additively manufactured as an object having a desired shape by a 3D printer to be described later.

Figure 1:
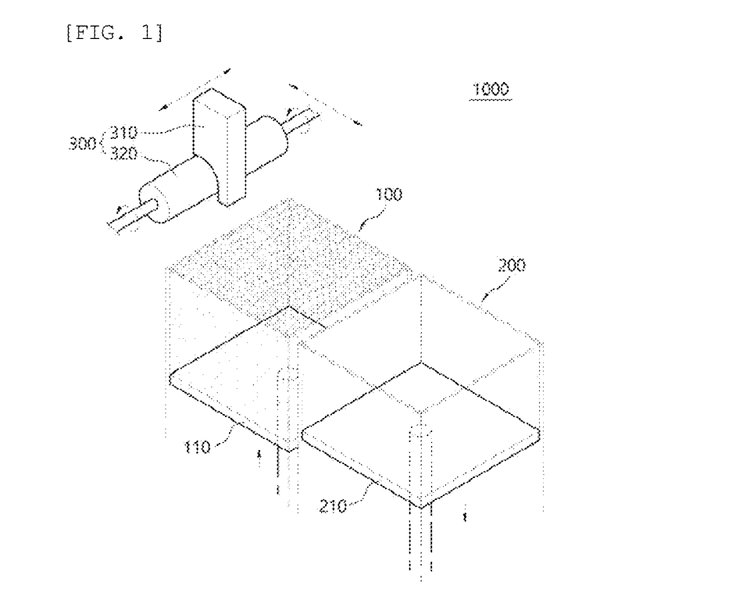
FIG. 1 is a view schematically showing elements of a 3D printer according to an embodiment of the disclosure.

FIG. 1 is a view schematically showing elements of a 3D printer according to an embodiment of the disclosure.

A 3D printer 1000 largely includes a feeder box 100, a builder box 200, and a working unit 300.

The feeder box 100 serves to feed a raw material, i.e., the powdery filament composition for the 3D printing.

The builder box 200 is a space in which an object is additively manufactured with the powdery filament composition for the 3D printing received from the feeder box 100 to form a desired shape by the working unit 300.

The working unit 300 is configured to transfer the filament composition while reciprocating above the feeder box 100 and the builder box 200 therebetween, and spray water (deionized (DI) water) to form a bridge only in an area, where the water is sprayed, of the filament composition, thereby additively manufacturing a desired shape.

The feeder box 100 includes a movable floor 110. The floor 110 moves up by a predetermined height whenever the additive manufacturing is performed once, thereby continuously feeding the filament composition.

The builder box 200 also includes a movable floor 210. The floor 210 is initially at the highest position, and moves down by a predetermined height whenever the additive manufacturing is performed once, thereby gradually forming an upper layer of a shape.

The floor 210 of the builder box 200 may further include a heat bed. The heat bed may include a heat source to meet a suitable temperature condition so that a crosslinking reaction can be promoted in the powdery filament composition while the additive manufacturing is performed. The temperature may range from 50° C. to 85° C. When the temperature of the heat bed is lower than 50° C., the crosslinking reaction between the metal particles in the powdery filament composition is so slow that the work takes a lot of time, the strength of the completed object is weakened, and the completed object may be decreased in sharpness and resolution as a bleeding phenomenon occurs due to the excessive capillary action of water. On the other hand, when the temperature of the heat bed is higher than 85° C., water evaporates quickly before a chelation reaction is completed, and therefore it is difficult to form a bridge, thereby having an effect on the strength of the completed object. Further, a desired texture of an object may not be obtained as the oxidation percentage of metal powder during the additive manufacturing is increased.

By adjusting the temperature of the powdery filament composition to be additively manufactured, as well as the temperature of the heat bed, within a certain range, it is possible to suppress the bleeding phenomenon that deteriorates the sharpness of the manufactured shape and causes a dimension error as water sprayed for the additive manufacturing penetrates between the metal powders due to the capillary action, and it is possible to improve the resolution of the manufactured object.

The working unit 300 includes an inkjet cartridge 310 and a leveling roller 320, in which the inkjet cartridge 310 may be filled with water, preferably, deionized water. The working unit sprays water through a nozzle to an area corresponding to a shape input to the 3D printer while reciprocating above the builder box. In the area to which water is sprayed, the chelator of the filament composition reacts to form a bridge between the metal powders. On the other hand, in the other areas to which water is not sprayed, such a bridge is not formed so that the filament composition can be removed in the form of powder, thereby leaving a desired shape.

The leveling roller 320 performs an operation of leveling the powdery filament composition so that a part for continuous work can be leveled. Further, the leveling roller 320 serves to push the filament composition, which is fed as the floor 110 of the feeder box 100 moves up, thereby transferring the filament composition to the builder box 200.

5) Additive Manufacturing Method

Below, a method of manufacturing an object having a desired shape as the powdery filament composition for the 3D printing is additively constructed by the 3D printer will be described.

The manufacturing method is based on the same principle as an additive manufacturing method using a general 3D printer.

In the method of manufacturing a desired shape according to the disclosure, printing is carried out in such a manner that filament composition is fed up to a predetermined height in the builder box; its surface is leveled; the inkjet cartridge then sprays water to the leveled surface of the filament composition so as to correspond to a shape input to the 3D printer while moving in zigzags so that strong bonds can be formed between the powders only in an area to which water is sprayed; a predetermined amount of filament composition is transferred again from the feeder box to the builder box after all the bonds in one layer are completed; the transferred filament composition is leveled; and water is then sprayed corresponding to the shape of the next layer.

Figure 2:
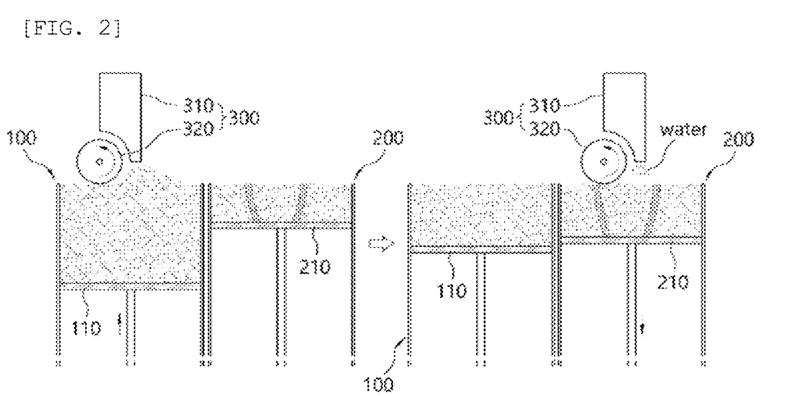
FIG. 2 is a view schematically showing a method of additively manufacturing a shape by a 3D printer according to an embodiment of the disclosure.

This process is schematically illustrated in FIG. 2.

In detail, the additive manufacturing method includes the steps of:

1) filling the feeder box with the powdery filament composition for 3D printing;

2) transferring a predetermined amount of a powdery filament composition for 3D printing at the top of the feeder box to the builder box while the working unit above the feeder box horizontally moves toward the builder box; and leveling the surface of the transferred a powdery filament composition;

3) spraying water in a predetermined pattern to form a bridge in the composition corresponding to an area to which water is sprayed, while the working unit horizontally moves above the powdery filament composition for the 3D printing transferred to an upper side of the builder box; and 4) preparing the next additive manufacturing by moving the working unit to an upper side of the feeder box and moving the floor of the feeder box up to a predetermined height.

Such steps of 1) to 4) are repeated to complete the input shape.

The floor, i.e., the heat bed of the builder box may be previously adjusted to have a temperature within the above-described range before starting the additive manufacturing method according to the disclosure, and then the additive manufacturing method according to the disclosure may be performed.

After an object is completed as above, the step of humidifying the object may be further carried out. The humidification may be performed by a humidifier, and may allow the chelator, which has not formed the chelation and the bridge yet, to additionally react and increase the strength of the object.

Figure 14:
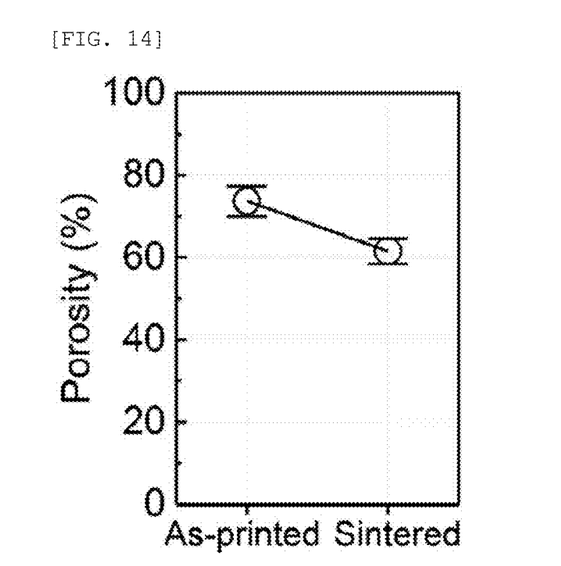
FIG. 14 is a graph showing porosity between aluminum powders of an object additively manufactured with aluminum filament composition according to an embodiment of the disclosure, in which the porosity measured in an object immediately after the additive manufacturing and the porosity measured in an object after sintering were compared.

Further, the object may be additionally subjected to a sintering process after the humidification reaction. In the sintering process, metal particles may undergo solid-state diffusion, thereby significantly decreasing the porosity between the particles in the object. This is shown in FIG. 14. The decrease in the porosity has effects on enhancing the compressive modulus and strength of the object.

Below, embodiments and effects of configurations according to the disclosure will be described in detail with specific examples. However, the embodiments are merely illustrative of the disclosure, and the scope of the disclosure should not be construed as being limited to the embodiments. Nonessential parts of the configurations defined in the appended claims can be modified, added or deleted by those skilled in the art without departing from the scope of the disclosure, and all such changes also fall within the scope of the disclosure.

First Embodiment: Citric Acid Salt+Aluminum Powder+NaCl (1) Preparation of Filament Composition Sodium citrate (NaCit, chemical formula 1, ≥99% purity, Sigma-Aldrich) salt was pulverized and prepared as a powdery chelator.

Then, the chelator powder was uniformly mixed with aluminum powder (≤40 mesh, Changseong) to make the chelator be 20 wt %, and then filtered through a sieve.

Sodium chloride (≤99% purity, Sigma-Aldrich) was added to this mixture so as to be 5 wt % and then uniformly mixed, thereby completing a powdery filament composition for 3D printing.

-Chemical formula 1-

(2) Binder Inkjet Metal 3D Printing

The powdery filament composition was additively manufactured to have a desired shape by the 3D printer 1000 with the configuration of FIG. 1. The feeder box 100 and the builder box 200 used products made of acrylic materials, Colorpod (Spitstec, The Netherlands), and a 3D printer kit (Geeetech I3 Pro, Shenzhen Getech) was used for the work unit 300.

Specifically, the floor 100 of the feeder box 100 is at the lowest position before starting the manufacturing. The feeder box 100 is filled with the powdery filament composition, and the powdery filament composition is leveled.

The inkjet cartridge 310 (HP45, Hewlett-Packard) of the working unit 300 was filled with deionized (DI) water.

The additive manufacturing includes the following steps.

i) The leveling roller 320 of the working unit 300 performs a leveling operation while pushing a predetermined amount of a powdery filament composition from the upper side of the feeder box 100 to the builder box 200. In this case, the floor 210 of the builder box 200 moves down to a predetermined height so that the filament composition cannot overflow.

ii) The working unit 300 horizontally moves and returns from the upper side of the builder box 200 to the upper side of the feeder box 100, and sprays deionized water filled in the inkjet cartridge 310 to the filament composition according to a cross-sectional pattern of a shape desired to be manufactured while reciprocating left and right in a direction perpendicular to the returning direction, thereby performing the additive manufacturing by strengthening the bond of the filament composition in the area to which the deionized water is sprayed.

iii) After the working unit 300 returns, the floor 110 of the feeder box 100 moves up again to be in a state for the transfer of the filament composition to the builder box, thereby standing by for the additive manufacturing for the next layer.

iv) The steps i) to iii) are repeated to manufacture a desired shape.

In this case, the additive manufacturing was carried out at a room temperature of 25° C. and a fixed printing speed of 2000 mm/min. Further, the builder box 100 and the nozzle of the inkjet cartridge 310 were maintained at a temperature of 70° C. to control an evaporation speed of water in the additive manufacturing process.

Second Embodiment: Citric Acid Salt+Copper Powder+NaCl (1) Preparation of a Powdery Filament Composition The powdery filament composition for the 3D printing was prepared in the same manner as in the first embodiment except that copper powder (≤40 mesh, Sigma-Aldrich) was mixed instead of the aluminum powder.

(2) Binder Inkjet Metal 3D Printing

It was carried out in the same manner as in the first embodiment.

Third Embodiment: Citric Acid Salt+Iron Powder+NaCl (1) Preparation of a Powdery Filament Composition The powdery filament composition for the 3D printing was prepared in the same manner as in the first embodiment except that iron (Fe) powder (≤40 mesh, Sigma-Aldrich) was mixed instead of the aluminum powder.

(2) Binder Inkjet Metal 3D Printing

It was carried out in the same manner as in the first embodiment.

Fourth Embodiment: Citric Acid Salt+Ti-6Al-4V Alloy Powder+NaCl (1) Preparation of a Powdery Filament Composition The powdery filament composition for the 3D printing was prepared in the same manner as in the first embodiment except that Ti-6Al-4V titanium alloy powder (≤325 mesh, also referred to as Grade 5, Korea Powder) was mixed instead of the aluminum powder.

(2) Binder Inkjet Metal 3D Printing

It was carried out in the same manner as in the first embodiment.

Fifth Embodiment: Filament Composition Containing Tartaric Acid Salt as Chelator (1) Preparation of a Powdery Filament Composition The powdery filament composition for the 3D printing was prepared in the same manner as in the first embodiment except that sodium tartrate (NaTar, chemical formula 2, ≥99% purity, Sigma-Aldrich) salt was used as the chelator instead of citric acid salt.

-Chemical formula 2-

(2) Binder Inkjet Metal 3D Printing

It was carried out in the same manner as in the first embodiment.

Sixth Embodiment: Filament Composition Containing Succinic Acid Salt as Chelator (1) Preparation of a Powdery Filament Composition The powdery filament composition for the 3D printing was prepared in the same manner as in the first embodiment except that sodium succinate (NaSuc, chemical formula 3, ≥99% purity, Sigma-Aldrich) salt was used as the chelator instead of citric acid salt.

-Chemical formula 3-

(2) Binder Inkjet Metal 3D Printing

It was carried out in the same manner as in the first embodiment.

Seventh Embodiment: Filament without NaCl Additive (1) Preparation of a Powdery Filament Composition The powdery filament composition for the 3D printing was prepared in the same manner as in the first embodiment except that an NaCl additive is not contained.

(2) Binder Inkjet Metal 3D Printing

It was carried out in the same manner as in the first embodiment.

Eighth Embodiment: Humidification Process after Additive Manufacturing

The object additively manufactured according to the first embodiment was taken out and subjected to the humidification as being sprayed with water at a speed of 35 ml/h for about 30 minutes through the humidifier.

Ninth Embodiment: Additive Manufacturing, Humidification and Sintering The object subjected to the humidification according to the eighth embodiment was sintered in a tube furnace (LHA-12/300, Lenton). The sintering was performed at a vacuum atmosphere of 0.3 torr or less.

First Comparative Example: Filament Composition Containing Ascorbate as Chelator (1) Preparation of a Powdery Filament Composition The powdery filament composition for the 3D printing was prepared in the same manner as in the first embodiment except that sodium ascorbate (NaAsc, chemical formula 4, ≥99% purity, Sigma-Aldrich) salt was used as the chelator instead of sodium citrate salt.

-Chemical formula 4-

(2) Binder Inkjet Metal 3D Printing

It was carried out in the same manner as in the first embodiment.

EXPERIMENTAL EXAMPLE

First Experimental Example: Ft-Ir Analysis

Figure 6A:
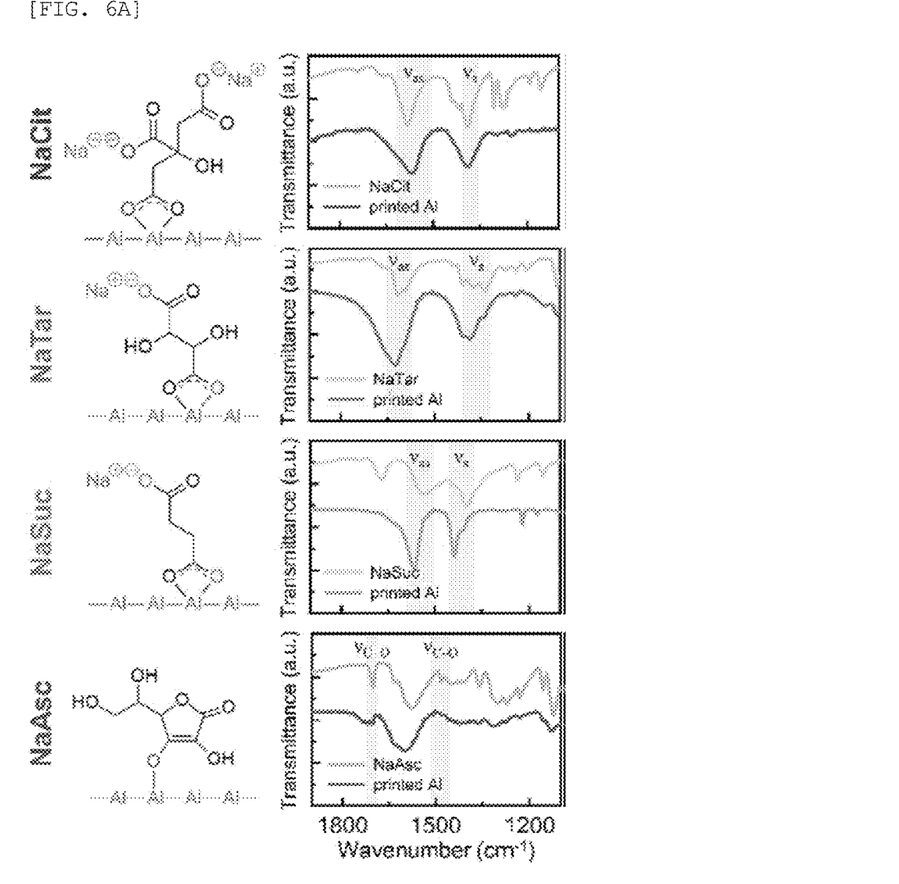
FIG. 6A shows chemical formulae (left) of sodium citrate (NaCit), sodium tartrate (NaTar), sodium succinate (NaSuc), and sodium ascorbate (NaAsc) among fruit acid salt compounds, which are usable as binders to form bridges on the surfaces of metal particles through a chemical bond (i.e., a coordinate bond), and graphs (right) of FT-IR spectrums in a state that the sodium salt 0.15 binders of fruit acid are coordinate bonded to aluminum in a powdery filament composition for 3D printing according to an embodiment of the disclosure.

The chelator fruit acid salts themselves according to the first, fifth and sixth embodiments and the first comparative example and the objects additively manufactured with the aluminum powders using these chelator fruit acid salts as the chelators were analyzed by VERTEX 70 FT-IR analyzer (Brucker Corporation, Germany), and their spectra were shown in FIG. 6A.

Referring to FIG. 6A, the chelators according to the first, fifth, and sixth embodiments, and the first comparative example, which respectively have three coordinate bonding positions, two coordinate bonding positions, two coordinate bonding positions, and one coordinate bonding position, show the peaks in the region of the COO— group, i.e., 1540 to 1720 $cm^{-1}$ and 1320 $cm^{-1}$. However, the comparative example 1 does not show this peak.

Second Experimental Example 2: SEM Pictures

Figure 6B:
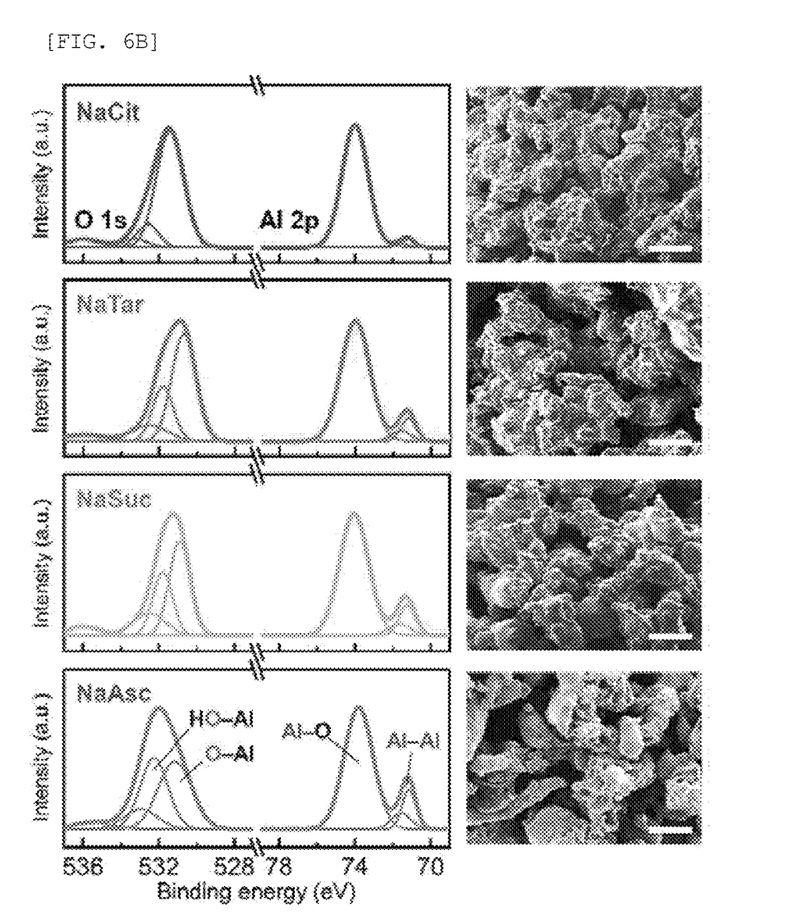
FIG. 6B shows the graphs (left) of a plurality of divided X-ray photoelectron spectroscopy (XPS) peaks of the fruit acid salt compounds shown in FIG. 6A, and scanning electron microscope (SEM) images (right) of cross-sections of the bridges formed by the fruit acid salt compounds between the metal powders.

1) The surfaces of the objects manufactured according to the first, fifth, and sixth embodiments and the first comparative example 1 were taken as scanning electron microscope (SEM) pictures (by microscope JEOL-7800F, Japan, JEOL) and shown in FIG. 6B.

Referring to the SEM pictures at the right side of FIG. 6B, it will be understood that Al—O, i.e., a bridge film becomes thicker as the chelator has more coordinate bonding positions, and thus the outline of the metal powder becomes indistinct. In the case of the first comparative example 1 (NaAsc), it will be understood that chelate coordination is not possible, and therefore the shape of the metal powder remains clearly.

Figure 8:
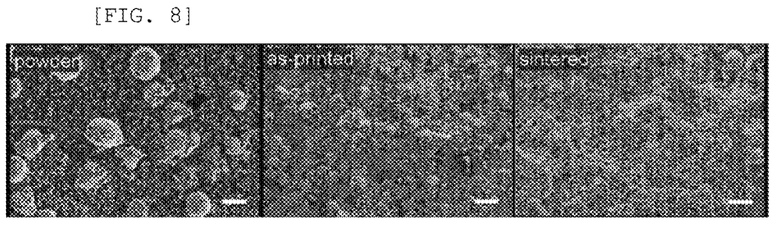
FIG. 8 shows SEM pictures of non-chelated (pristine) aluminum powder (left), a microstructure (middle) obtained immediately after printing an object additively manufactured with filament composition for 3D printing according to an embodiment of the disclosure by a 3D printer according to an embodiment of the disclosure, and the microstructure (right) after sintering (scale bar length: 100 μm).

2) The surfaces of the objects manufactured according to the first and ninth embodiments were taken as SEM pictures (by the same microscope) and compared in FIG. 8. FIG. 8 shows the surface of the non-chelated (i.e., pristine) aluminum powder (left) for the comparison. The object according to the first embodiment 1 is shown in the middle, and the surface of the sintered object according to the ninth embodiment is shown on the right.

Referring to FIG. 8, it will be understood that the sintered object is significantly decreased in internal porosity as compared with an immediately printed object, and thus decreased in surface unevenness and increased in density.

Figure 11:
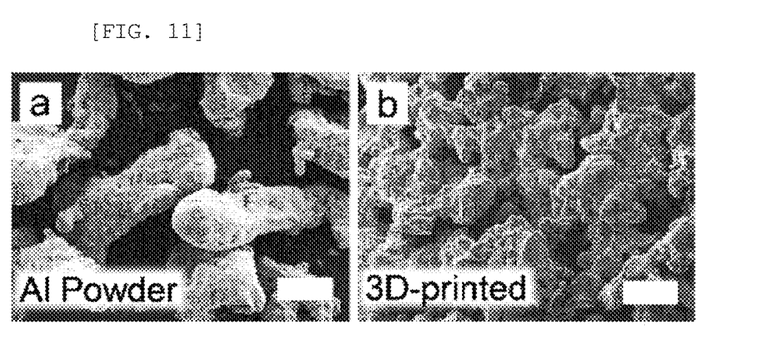
FIG. 11 shows SEM pictures of non-chelated (pristine) aluminum powder (left), and a microstructure (right) of a structure additively manufactured with filament composition including aluminum powder for 3D printing according to an embodiment of the disclosure (each scale bar length: 100 μm).
Figure 12:
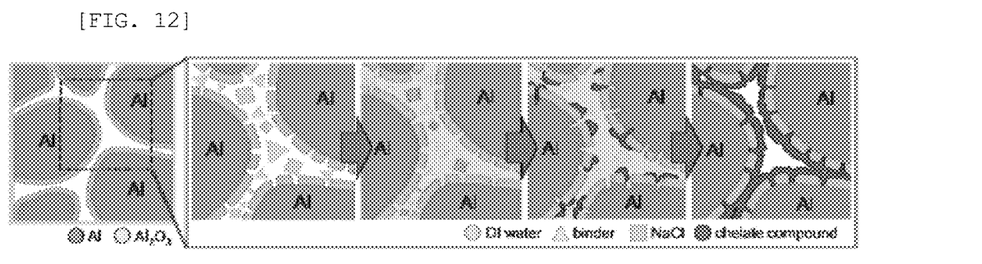
FIG. 12 schematizes a process of forming a bridge when sodium chloride additives are further included in the process of forming the bridge shown in FIG. 6.
Figure 13:
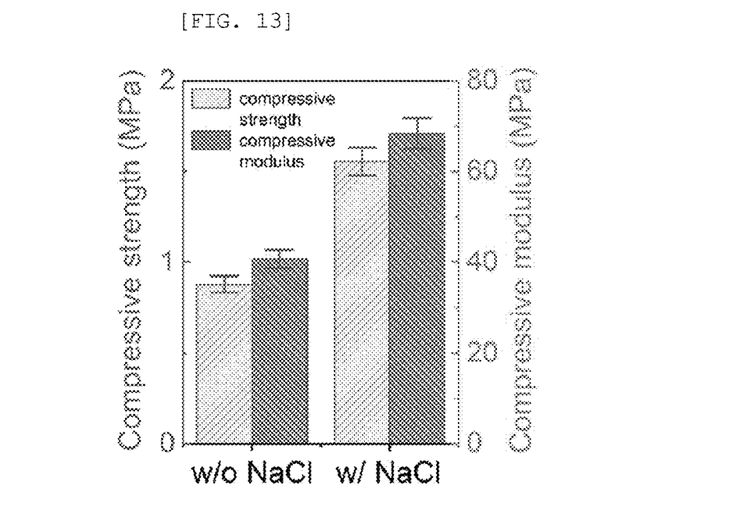
FIG. 13 is a comparison graph showing the compressive strength and the compressive modulus between objects additively manufactured using filament composition according to an embodiment of the disclosure without sodium chloride additives (w/o NaCl) and with sodium chloride additives (w/ NaCl).

3) A non-chelated aluminum powder and the surface of the object manufactured according to the first embodiment were taken as the SEM picture (by the same microscope) and compared in FIG. 11. The surface of the non-chelated aluminum powder is shown on the left (a), and the surface of the object additively manufactured according to the first embodiment is shown on the right (b).

Referring to FIG. 11, it will be understood that the non-chelated aluminum powders are separated without the bonds between the powders, but the surfaces of the aluminum powders are bonded by the bridge so that the powders can be connected like a single particle in the filament composition formed with the chelator and the bridge according to the first embodiment.

Third Experimental Example: XPS Analysis 65-40 2022-04-04

The objects manufactured according to the first, fifth, and sixth embodiments and the first comparative example were subjected to the XPS analysis (XPS spectrometer ESCALAB 250Xi, U.S., Thermo-Scientific) and shown in FIG. 6B. Further, a molar ratio of Al—O/Al—Al and a molar ratio of O—Al/O, obtained by applying the XPS analysis to the non-chelated (i.e., pristine) aluminum powder and the objects manufactured according to the first, fifth, and sixth embodiments and the first comparative example were shown in FIG. 6C.

Figure 6C:
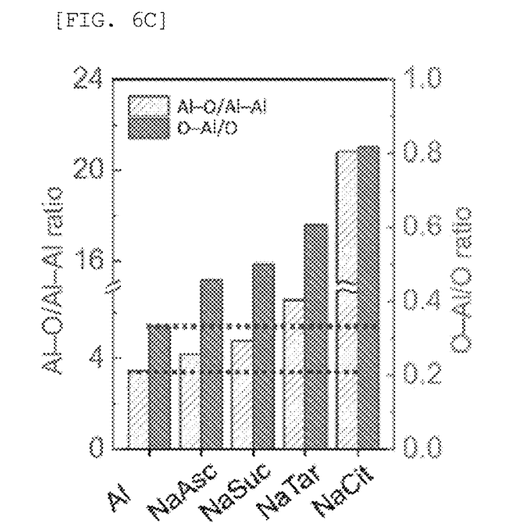
FIG. 6C is a graph showing that a molar ratio of Al—O/Al—Al between an Al—O bond and an Al—Al bond and a molar ratio of O—Al/O between an O—Al bond and an O atom are compared in structures with respect to non-chelated (pristine) aluminum powder and metal (aluminum) powders between which that the fruit acid salt compounds listed in FIG. 6A form the bridges.

Referring to FIG. 6C, it will be understood that the aluminum powders added with the foregoing chelators are significantly increased in the molar ratio of Al—O to Al—Al as compared with the non-chelated aluminum powder, and, among them, the filament composition containing sodium citrate salt according to the first embodiment corresponding to the largest number of coordinate bonding positions has the highest molar ratio of Al—O/Al—Al. This was the same in the case of the molar ratio of O—Al/O.

Fourth Experimental Example: Measurement of Compressive Strength and Compressive Modulus 1) The compressive strength and compressive modulus of the objects manufactured according to the first, fifth, and sixth embodiments and the first comparative example were measured by the universal testing machine (QC-506M2F, Comtech), and the measurement values were compared as shown in the graph of FIG. 6D.

Figure 6D:
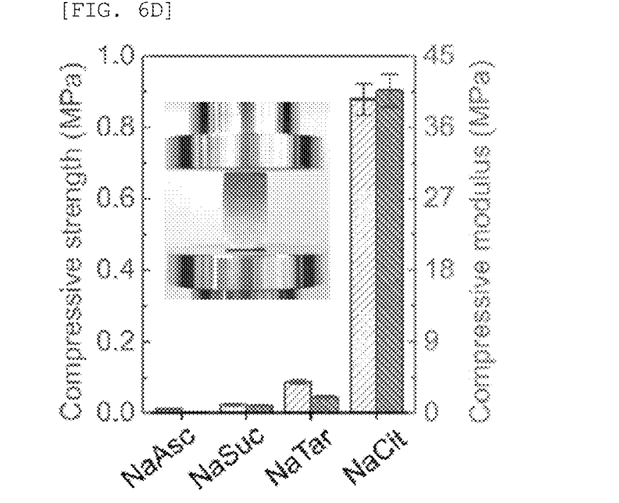
FIG. 6D is a graph showing the compressive strength and compressive modulus of an additively manufactured structure when the fruit acid salt compounds listed in FIG. 6A form the bridges between the aluminum the metal powders.
Figure 7A:
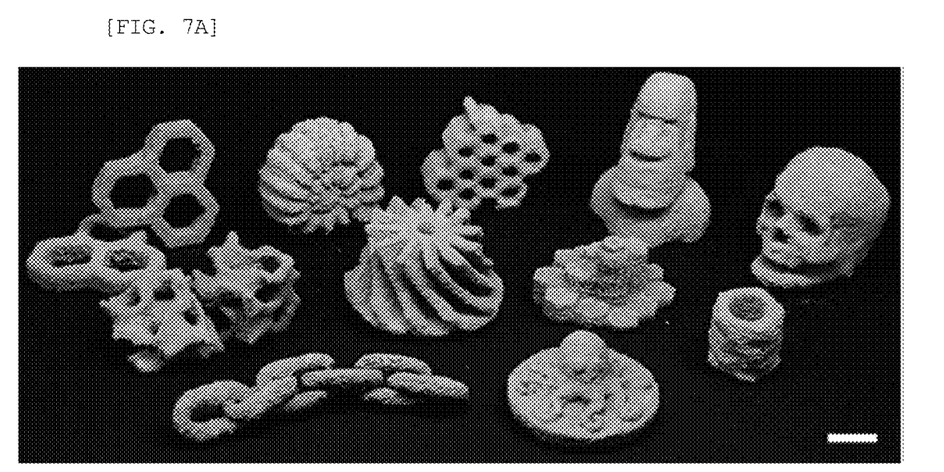
FIG. 7A is a picture of various objects additively manufactured with filament composition for 3D printing according to an embodiment of the disclosure by a 3D printer according to an embodiment of the disclosure (scale bar length: 10 mm).
Figure 7B:
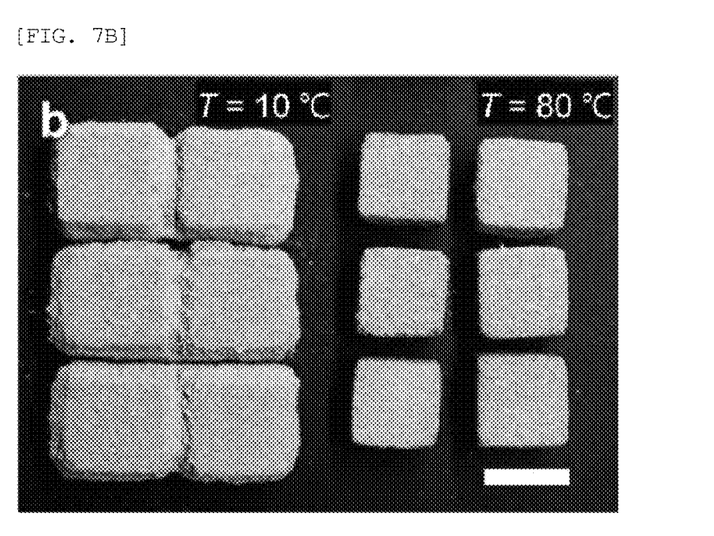
FIG. 7B shows a comparison in shape between objects additively manufactured on a heat bed of a builder box floor having a temperature of 10° C. and objects additively manufactured on the heat bed having a temperature of 80° C., when the 3D printer according to an embodiment of the disclosure performs the additive manufacturing with filament composition for 3D printing according to an embodiment of the disclosure, in which it is seen that the objects additively manufactured by setting the temperature of the heat bed to 80° C. have a higher resolution (scale bar length: 10 mm).
Figure 7C:
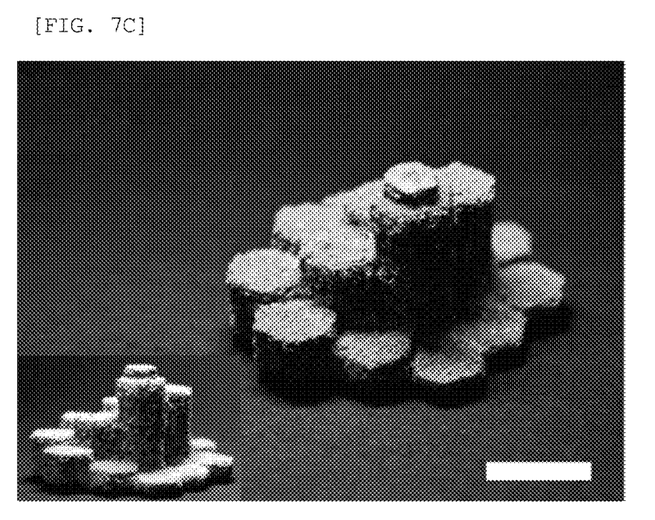
FIG. 7C is a picture of a product shaped showing that an object additively manufactured with filament composition for 3D printing according to an embodiment of the disclosure by a 3D printer according to an embodiment of the disclosure has a high level of accuracy (scale bar length: 10 mm).
Figure 7D:
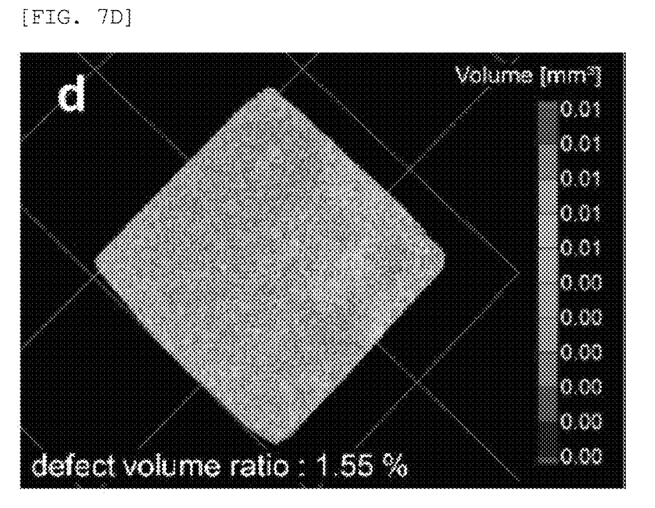
FIG. 7D is a micro computerized tomography (CT) rendering picture showing that an object additively manufactured with filament composition for 3D printing according to an embodiment of the disclosure by a 3D printer according to an embodiment of the disclosure has low porosity

Referring to FIG. 6D, it will be understood that the compressive strength and compressive modulus of the manufactured object are increased with the chelator with more functional groups for forming the chelate bonding. In particular, the first embodiment using sodium citrate salt showed the most significant strength.

Figure 9:
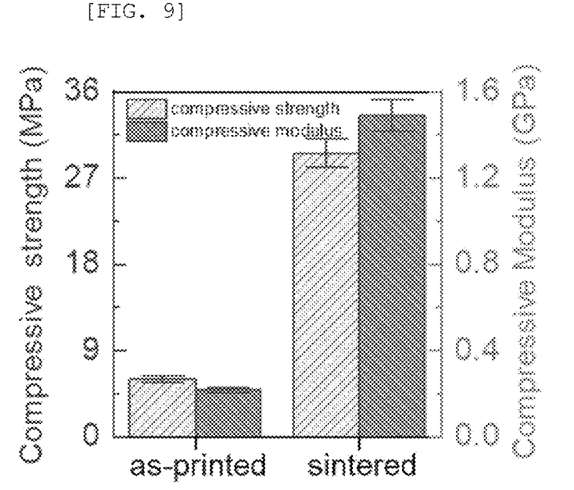
FIG. 9 is a comparison graph showing the compressive strength and the compressive modulus between the object immediately after printing and the object after sintering, which have been compared in FIG. 8.
Figure 10:
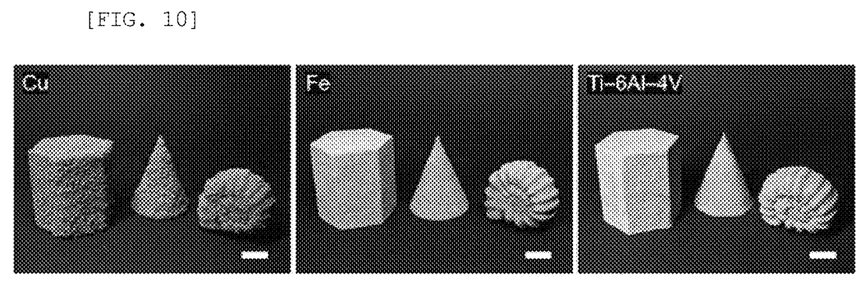
FIG. 10 shows pictures of the outer appearances of objects additively manufactured with filament composition for 3D printing including copper powder (left), iron powder (middle) and Ti-6Al-4V alloy powder (right) according to an embodiment of the disclosure by a 3D printer according to an embodiment of the disclosure (scale bar length: 10 mm).

2) The compressive strength and compressive modulus of the objects additively manufactured according to the first embodiment and seventh embodiment were measured and compared in the graph of FIG. 9 (by the same equipment).

Referring to FIG. 9, the object containing with the NaCl additive was found to have higher compressive strength and higher compressive modulus, and the additively manufactured object was significantly increased in compressive strength and compressive modulus by sintering.

Fifth Experimental Example 5: Porosity Measurement (1) Mercury Intrusion

The porosities of the objects additively manufactured according to the first and ninth embodiments were measured and compared as shown in the graph of FIG. 14. The porosities of the objects were measured by the mercury intrusion test.

As shown in the graph of FIG. 14, it will be understood that the porosity of the object is significantly decreased after sintering.

(2) Micro CT Analysis

Figure 15:
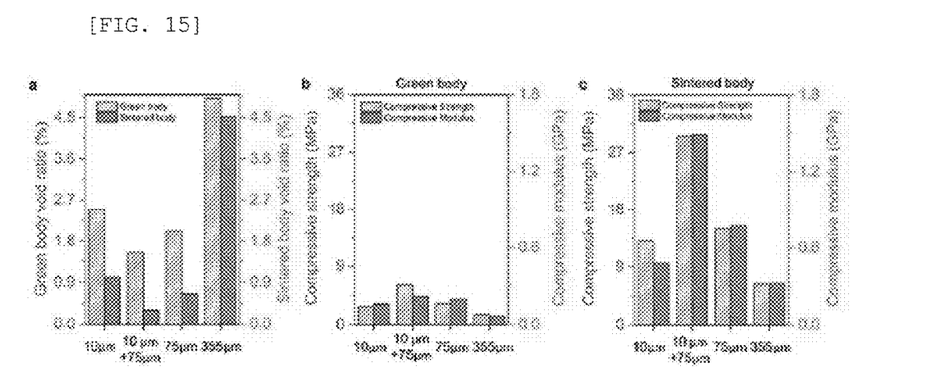
FIG. 15 shows a) a comparison graph showing porosity of an object additively manufactured and sintered according to an embodiment of the disclosure, which is measured by micro-CT, b) a graph showing the compressive strength and compressive modulus of an object not sintered, and c) a graph showing the compressive strength and compressive modulus of the sintered object, in which measured values were distinguished according to particle size distributions of aluminum powder in all of a) to c).

The porosities of the objects additively manufactured according to the first and ninth embodiments were measured by the micro CT and shown in FIG. 15.

As shown in the graph of FIG. 15, it will be understood that the porosity of the object is significantly decreased after sintering.

DESCRIPTION OF REFERENCE NUMERALS

1000: 3D printer
100: feeder box
110: feeder box floor
200: builder box
210: builder box floor
300: working unit
310: inkjet cartridge
320: leveling roller

What is claimed is:

1. A powdery composition for 3D printing, comprising:
a metal powder;
a multifunctional carboxylic acid salt powder that reacts with water to form a metal-chelate bridge with the surfaces of at least two adjacent metal powders for bonding between the metal powders, and
an alkali metal salt additive that strengthens the bond between metal powders,
wherein the metal powder and the multifunctional carboxylic acid salt powder are mixed in a weight ratio of 90:10 to 75:25, and
wherein the alkali metal salt additive is included in an amount of 2 to 7 wt. % based on the total weight of the powdery composition.

2. The powdery composition of claim 1, wherein the multifunctional carboxylic acid salt comprises a multifunctional α-hydroxy acid salt.

3. The powdery composition of claim 1, wherein the multifunctional carboxylic acid salt comprises a metal salt compound of a fruit acid derived from fruits.

4. The powdery composition of claim 1, wherein the metal powder comprises power of copper (Cu), iron (Fe), aluminum (Al), titanium (Ti) or an alloy comprising one or more selected among them.

5. The powdery composition of claim 1, wherein the metal powder has an average particle size of 5 μm to 400 μm.

* * * * *